(12) United States Patent
Leroux et al.

(10) Patent No.: US 9,416,754 B2
(45) Date of Patent: Aug. 16, 2016

(54) MODULE FOR SUPPLYING GAS TO A MOTOR VEHICLE

(71) Applicant: Valeo Systemes de Controle Moteur, Cergy Saint Christophe (FR)

(72) Inventors: Samuel Leroux, Poissy (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 139 days.

(21) Appl. No.: 14/351,283

(22) PCT Filed: Oct. 10, 2012

(86) PCT No.: PCT/FR2012/052296
§ 371 (c)(1),
(2) Date: Apr. 11, 2014

(87) PCT Pub. No.: WO2013/054038
PCT Pub. Date: Apr. 18, 2013

(65) Prior Publication Data
US 2014/0251288 A1    Sep. 11, 2014

(30) Foreign Application Priority Data
Oct. 12, 2011  (FR) .................................... 11 59233

(51) Int. Cl.
| F02B 47/08 | (2006.01) |
| F02M 25/07 | (2006.01) |
| F02M 35/10 | (2006.01) |
| F02B 29/04 | (2006.01) |

(52) U.S. Cl.
CPC ............ *F02M 25/07* (2013.01); *F02B 29/0475* (2013.01); *F02M 35/10144* (2013.01); *F02M 35/10268* (2013.01); *F02B 29/0437* (2013.01); *Y02T 10/146* (2013.01)

(58) Field of Classification Search
CPC ............ F02M 25/0707; F02M 25/074; F02M 25/0701; F02M 25/0703; F02B 3/06
USPC ..................................................... 123/568.11
See application file for complete search history.

(56) References Cited

U.S. PATENT DOCUMENTS

2009/0071450 A1 * 3/2009 Doring ................ F02B 29/0412
123/563
2010/0089355 A1   4/2010 Fredrickson et al.

FOREIGN PATENT DOCUMENTS

| FR | 2 908 833 A1 | 5/2008 |
| FR | 2 953 255 A1 | 6/2011 |
| WO | 2009/141711 A1 | 11/2009 |

OTHER PUBLICATIONS

International Search Report for corresponding International Application No. PCT/FR2012/052296, mailed Jan. 3, 2013 (2 pages).

* cited by examiner

*Primary Examiner* — Lindsay Low
*Assistant Examiner* — Charles Brauch
(74) *Attorney, Agent, or Firm* — Osha Liang LLP

(57) ABSTRACT

The invention relates to a module (100) for supplying gas to a motor vehicle, comprising a double dispenser (108), a charge air cooler (107), and an intake box (119) connecting said double dispenser (108) to said cooler (107), the double dispenser (108) comprising a first outlet (136) intended to lead into the intake box (119) and a second outlet intended to lead toward the outside of said module (100).

10 Claims, 2 Drawing Sheets

Figure 4:
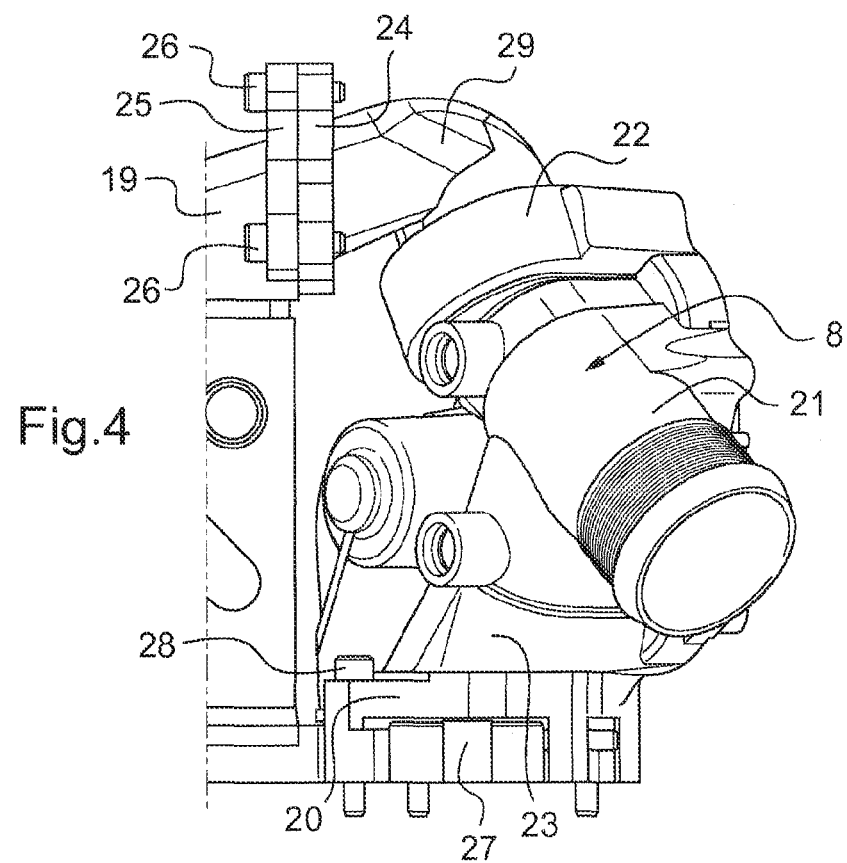

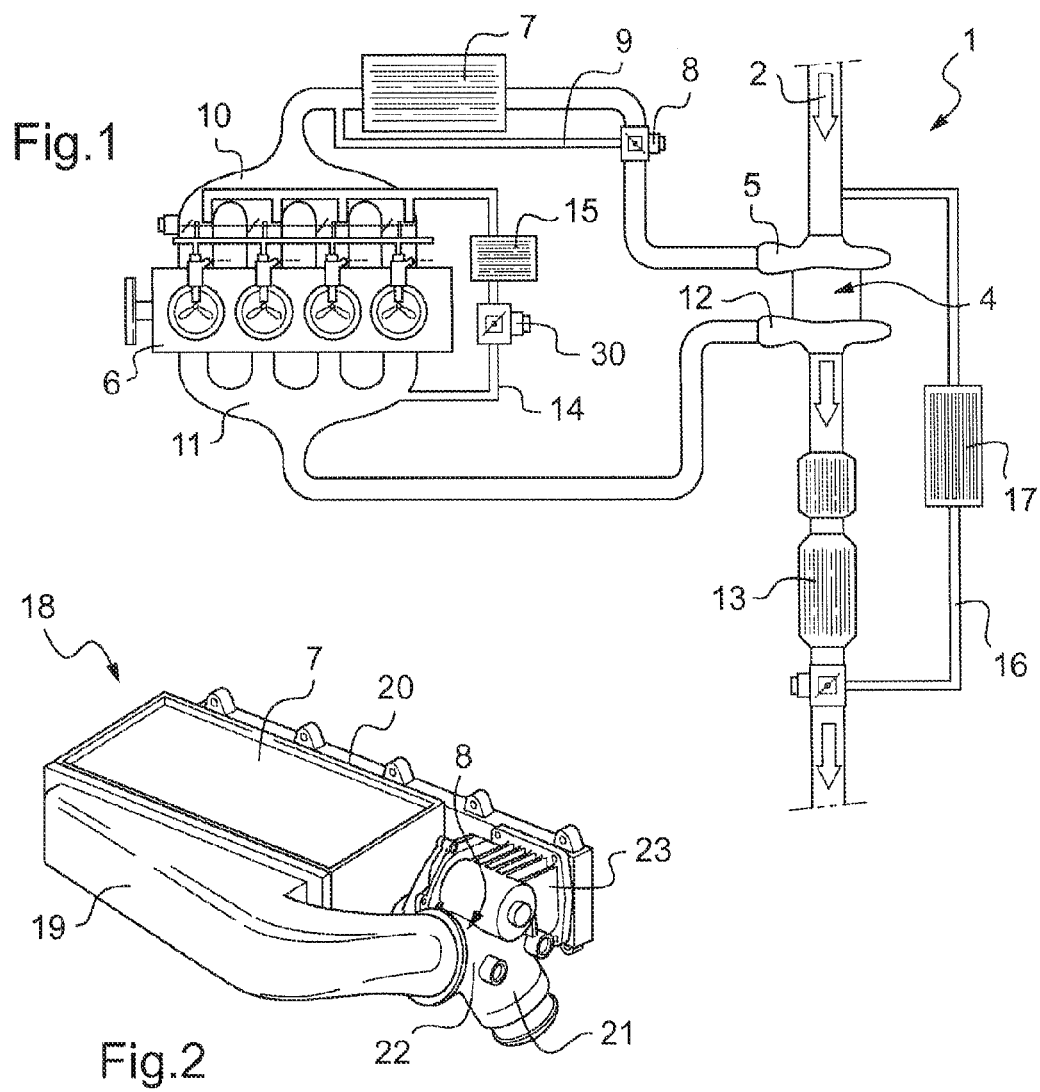
Fig.1
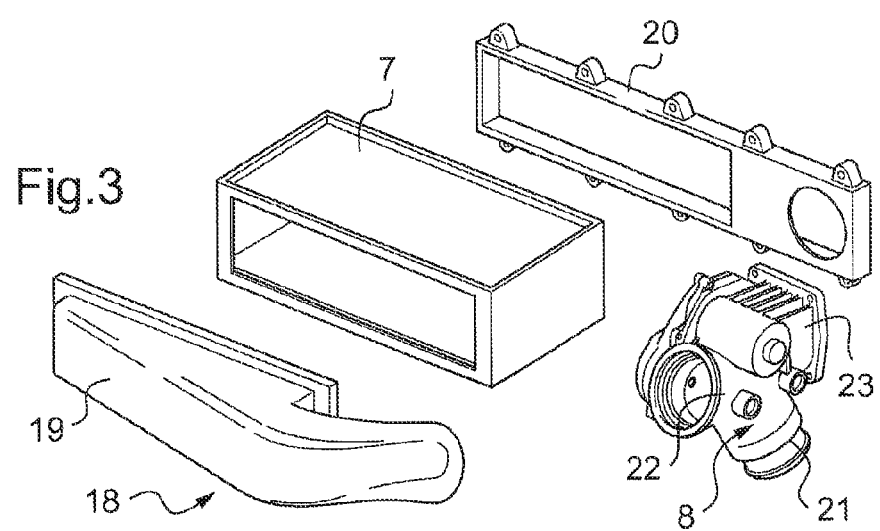
Fig.2
Fig.3

MODULE FOR SUPPLYING GAS TO A MOTOR VEHICLE

The invention relates to a module for supplying gas to a motor vehicle engine. Although the engine is generally supplied with air, the term "gas" is more appropriate, since it may in particular include a mixture of air and exhaust gases output by a parallel EGR (Exhaust Gas Recirculation) circuit. Typically, a circuit for supplying gas to a motor vehicle engine is shown schematically in FIG. 1. Such a circuit 1 comprises an air inlet 2, the incident gas being intended, in a first step, to supply a turbocharger 4. A supercharger 5 sends pressurized gas toward the engine 6, it being possible for this air to be cooled beforehand by means of a gas cooler 7 positioned upstream of said engine 6, or injected directly into said engine 6 without being cooled. Specifically, a gas double dispenser 8 positioned upstream of the cooler 7 makes it possible to orient the gas toward said cooler 7, or directly toward the engine 6 by way of a parallel duct 9 that short-circuits this cooler 7. The gas arrives, in a second step, in an intake manifold 10 positioned upstream of said engine 6. At the outlet of the engine 6, the gas escapes by means of an exhaust manifold 11 positioned downstream of the latter. The gas is then conveyed toward the turbine 12 of the turbocharger 4, which sends it toward a particle filter 13 before being expelled to the outside of the vehicle. A high-pressure EGR circuit 14 having a cooler 15 and a shut-off valve 30 connects the intake manifold 10 to the exhaust manifold 11. A low-pressure EGR circuit 16 likewise provided with a low-pressure valve and a cooler 17 connects that part of the gas circuit 1 that is located upstream of the supercharger 5 to that part of said circuit 1 that is located between the filter 13 and the gas outlet.

With reference to FIGS. 2 and 3, it is known to collect, within one and the same module 18 for supplying gas, the gas double dispenser 8, the cooler 7, an intake box 19 connecting these two elements 7, 8, and an interface flange 20 for fixing the cooler 7 and the double dispenser 8 to the cylinder head 27 of the engine 6. The gas double dispenser 8 has a gas inlet passage 21, a first gas outlet passage 22 toward the intake box 19 that leads into the cooler 7, and a second gas outlet passage 23 that leads into the cylinder head 27 of the engine 6. The four main components 7, 8, 19, 20 that form this module 18 of compact form are closely imbricated in one another, the double dispenser 8 being in particular blocked between the intake box 19 and the interface flange 20, making it difficult to fit or remove said double dispenser 8 within this compact module 18.

In order to remedy this problem of fitting/removing the double dispenser 8, a system for fixing this double dispenser 8 in the module 18 is illustrated in FIG. 4. The first outlet passage 22 of the air double dispenser 8 is extended by an added passage 29, while the intake box 19 is shortened. Said added passage 29 is fixed rigidly to the intake box 19, causing an end flange 24 of said added passage 29 to coincide with an end flange 25 of said box 19, said flanges 24, 25 being fixed together by means of a plurality of screws 26. Similarly, the second outlet passage 23 of this double dispenser 8 is likewise fixed to the cylinder head 27 with screws 28 and by way of the interface flange 20. Such a fixing system has the drawback of being bulky, in particular in the region of the added passage 29, which projects from said module 18, forming an elbow. It is likewise rigid, since the fixing of the first and second outlet passages 22, 23 of the double dispenser 8 by means of screws 26, 28 does not allow any relative movement of the double dispenser 8 in the event of any mechanical stresses within the module 18 for supplying gas. Finally, this fixing system is complicated to implement, since the double dispenser 8 has to be positioned in a very precise manner beforehand in order to make the various orifices provided for the screws 26, 28 correspond, and a screw fastening 26, 28 continues to take a fairly long time to produce.

The application FR 2 953 255 discloses a duct connecting an outlet of a double dispenser to an intake box, said connection implementing a screw connection.

The invention relates to a module for supplying gas to a motor vehicle, which aims to remedy the above main drawbacks.

The subject of the invention is a module for supplying gas to a motor vehicle, comprising a double dispenser, a gas cooler, and an intake box connecting said double dispenser to said cooler, the double dispenser comprising a first outlet intended to lead into the intake box and a second outlet intended to lead toward the outside of said module.

The module according to the invention comprises a duct connecting the first outlet of the double dispenser to the intake box, said connection implementing at least one interlocking connection. In this way, each interlocking connection that is implemented in order to produce this connection makes it possible for the duct to be fitted in the module in a more flexible manner by allowing said duct to be positioned in said module in a not rigidly fixed manner. In addition, in the event of any mechanical stress in the region of the module, this type of connection can allow a slight movement of the duct within the module in order to absorb said stress. The fitting of this duct in the module is simplified, since the interlocking connection does not require very precise prior positioning of the duct, and does away with additional fixing means of the screw type. Finally, since an interlocking connection is brought about by mutual interpenetration between two components, it thus allows a saving of space compared with a connection that consists in bringing one of the two surfaces into contact with the other and then securing them together with conventional fixing means.

A double dispenser acts as a valve, receiving an incident gas originating from a supercharger and redirecting it in a selective manner, either directly toward the intake manifold of the engine, or toward the cooler positioned upstream of said manifold in order to inject cooled air into the engine. The first outlet of the double dispenser thus makes it possible to redirect the gas toward the cooler, while the second outlet makes it possible to direct the gas directly toward the intake manifold of the engine. An "outlet" is a general term and may for example describe either an opening in the double dispenser or one end of an end piece that emerges from said dispenser.

Advantageously, the duct is connected to the first outlet of the double dispenser and to the intake box by means of two interlocked connections. This is an optimized configuration that provides the fitting of the duct in the module with great flexibility and allows a maximum saving of space. The fitting of this duct in the module is further simplified, since neither of the two connections involved requires additional fixing means of the screw type.

Preferably, at least one of the two interlocking connections is a sliding connection. In this way, the components can be interlocked with one another by a movement in translation in the region of this sliding connection, allowing an adjustment in linear position between the duct and the intake box and/or the double dispenser.

Preferably, at least one of the two connections is a ball joint connection. In this way, the components can be interlocked with one another by a rotary movement, allowing an adjustment of the rotational position between the duct and the intake box and/or the double dispenser. According to a preferred embodiment of a module according to the invention, the connection between the duct and the intake box is a sliding connection and the connection between said duct and the first outlet of the dispenser is a ball joint connection.

Advantageously, at least one of the two ends of the duct has a circular section.

Advantageously, at least one of the two ends of the duct has a rectangular section.

Preferably, the connection between the duct and the intake box is of the male/female type.

Preferably, at least one of the two connections involves a seal. Even if the fitting of the duct in the module has a certain flexibility, it must nevertheless ensure a high level of leak tightness within said module. The presence of a seal thus makes it possible to ensure this leak tightness.

Advantageously, the seal is a lip seal. Such a seal ensures radial leak tightness between two rotating or sliding components.

Advantageously, the duct is bent and makes it possible to distinguish two segments that form an angle of close to 100° between one another. The term "close" means that the two segments form an angle of 100°, plus or minus 20°, between one another. The fact that the duct is bent adds to the compactness of the module for supplying gas according to the invention.

A module for supplying gas to a motor vehicle according to the invention has the advantage of occupying little space and being easy and quick to fit, mainly on account of the system of interlocking connection of the duct in said module, which takes up little space and does not require any specific tools. It also has the advantage of being able to be fitted with a certain flexibility, since the duct does not have to be positioned with great precision beforehand in order to be fixed in the module and tolerates a certain approximation of positioning.

A further subject of the invention, according to another of its aspects, is a module for supplying gas to a motor vehicle, comprising a double dispenser, a gas cooler, and an intake box connecting said double dispenser to said cooler, the double dispenser comprising a first outlet intended to lead into the intake box and a second outlet intended to lead toward the outside of said module, the module comprising a duct that connects the first outlet of the double dispenser to the intake box, said connection implementing at least one interlocking connection which is a sliding connection.

The detailed description of a preferred embodiment of a module for supplying gas to a vehicle engine is given below with reference to FIGS. 1 to 5.

Figure 5:
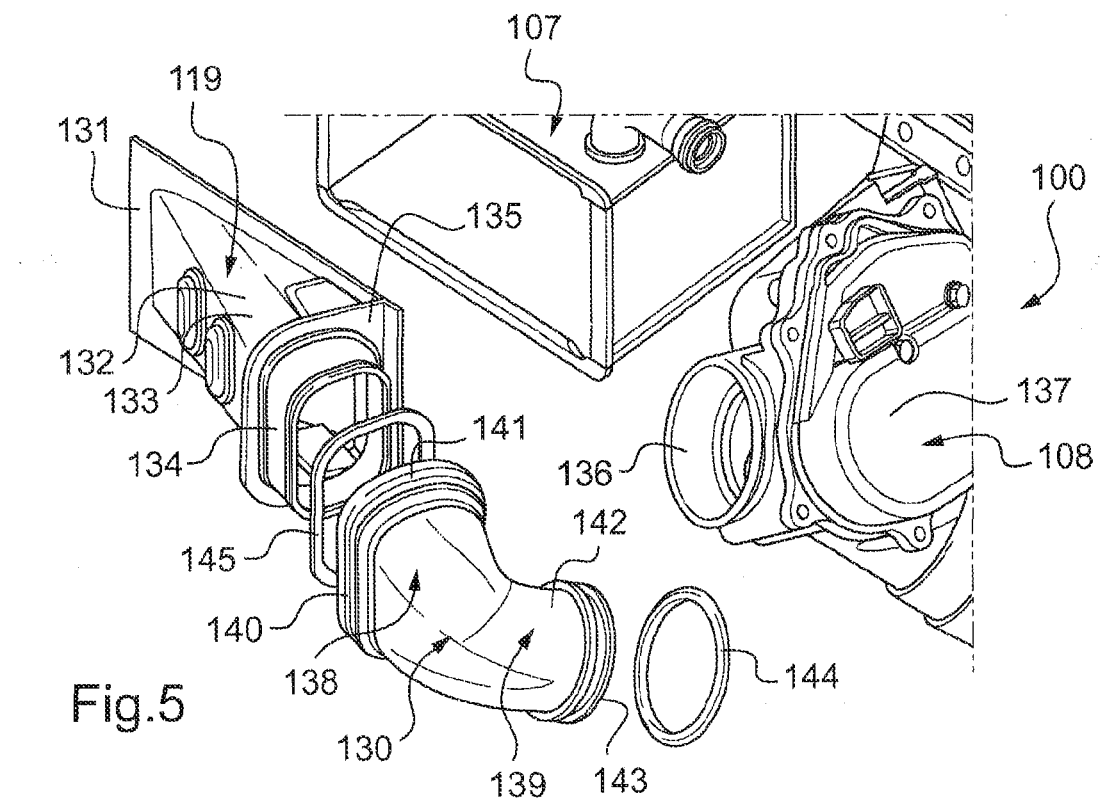

FIG. 1 is a schematic view of a circuit for supplying air to a motor vehicle engine, FIG. 2 is a perspective view of a module for supplying gas to a vehicle engine, according to the prior art, FIG. 3 is an exploded view of the module from FIG. 2, FIG. 4 is a perspective view of a double dispenser, showing the two fixing points of said dispenser in a module for supplying gas to an engine according to the prior art, FIG. 5 is a partially exploded view of a module for supplying gas according to the invention.

FIGS. 1, 2, 3 and 4 have already been described. With reference to FIG. 5, a module 100 for supplying gas according to the invention comprises a double dispenser 108, an intake box 119, a charge air cooler (CAC) 107 and an interface flange (not visible in the figure) and an independent duct 130 intended to connect said intake box 119 and said double dispenser 108. The CAC 107 is a conventional cooling heat exchanger, which is formed by a substantially parallelepipedal rectangular component and to which the intake box 119 is fixed. Said box 119 has a flat face 131 provided with a rect-angular central opening, said face 131 being surmounted by an oblique tube 132, a first end of which is formed by said central opening. The term "oblique" means that said tube 132 is neither perpendicular nor parallel to the plane of the flat surface 131. A second end 133 of the tube 132 is extended by an end piece 134 that has a rectangular section, the four corners of which are rounded, said end piece 134 extending in a longitudinal direction of said tube 132. This end piece 134 starts in the region of a widened stop wall 135, the surface plane of which is perpendicular to the longitudinal axis of the tube 132. The outer surface of this end piece 134 is smooth. The double dispenser 108 comprises an air inlet passage (not visible in the figure), a first air outlet 136 intended to be connected to the intake box 119 by means of the independent duct 130, and a second air outlet intended to be placed in direct communication with the air intake manifold by way of an interface flange (the second outlet, the manifold and the interface flange are not visible in the figure). The double dispenser 108 comprises a main body 137, and the first air outlet 136 of said double dispenser 108 is in the form of a circular opening, flush with a surface of said body 137. The independent duct 130 provided to connect the intake box 119 to the first outlet 136 of the double dispenser 108 has an elbow that makes it possible to distinguish a first flared segment 138 and a second segment 139 having a smaller size, said segments 138, 139 forming an angle of close to 90° between one another. A free end 140 of the first segment 138 has a rectangular section, the four corners of which are rounded, the dimensions of said section being greater than the dimensions of the rectangular section of the end piece 134 of the oblique tube 132 of the intake box 119. This first free end 140 of the duct 130, which is intended to be forcibly interlocked by sliding around the end piece 134 of the intake box 119, has a peripheral external overthickness 141, formed by a series of annular ribs located side-by-side. A first annular lip seal 145 is intended to be inserted around said overthickness 141, between the free end 140 of the first segment 138 and the end piece 134 of the intake box 119, in order to ensure proper leak tightness between said box 119 and the double dispenser 108. A free end 142 of the second segment 139 has a circular section, the wall delimiting said free end being widened by means of two parallel annular flanges 143 that emerge from the outer surface thereof. An annular seal 144 is intended to be inserted between said flanges 143. The free end 142 of this second segment 139 is intended to be forcibly inserted by rotation into the opening that embodies the first air outlet 136 of the double dispenser 108, said seal 144 being dimensioned to ensure proper leak tightness between the independent duct 130 and the double dispenser 108. The interlocking connection established between the independent duct 130 and the intake box 119 is of the sliding type, while the connection implemented between this duct 130 and the double dispenser 108 is of the ball joint type.

The invention claimed is:

1. A module for supplying gas to a motor vehicle, comprising:
   a double dispenser;
   a gas cooler;
   an intake box connecting said double dispenser to said cooler,
   the double dispenser comprising a first outlet intended to lead into the intake box and a second outlet intended to lead toward an outside of said module; and
   a duct that connects the first outlet of the double dispenser to the intake box, the duct being connected to the first outlet of the double dispenser by an interlocked connection and the duct being connected to the intake box by another interlocked connection, wherein at least one of the two interlocking connections is a sliding connection.

2. The module as claimed in claim 1, wherein at least one of the two interlocking connections is a ball joint connection.

3. The module as claimed in claim 1, wherein the connection between the duct and the intake box is a sliding connection, and the connection between said duct and the first outlet of the double dispenser is a ball joint connection.

4. The module as claimed in claim 1, wherein at least one of the two ends of the duct has a circular section.

5. The module as claimed in claim 1, wherein at least one of the two ends of the duct has a rectangular section.

6. The module as claimed in claim 1, wherein the connection between the duct and the intake box is of a male/female type.

7. The module as claimed in claim 1, wherein at least one of the two connections involves a seal.

8. The module as claimed in claim 1, wherein the duct is bent and makes it possible to distinguish two segments that form an angle of close to 100° between one another.

9. A module for supplying gas to a motor vehicle, comprising:
   a double dispenser;
   a gas cooler;
   an intake box connecting said double dispenser to said cooler,
   the double dispenser comprising a first outlet intended to lead into the intake box and a second outlet intended to lead toward an outside of said module; and
   a duct that connects the first outlet of the double dispenser to the intake box, the duct being connected to the first outlet of the double dispenser by an interlocked connection and the duct being connected to the intake box by another interlocked connection,
   wherein at least one of the two interlocking connections is a ball joint connection.

10. A module for supplying gas to a motor vehicle, comprising:
    a double dispenser;
    a gas cooler;
    an intake box connecting said double dispenser to said cooler,
    the double dispenser comprising a first outlet intended to lead into the intake box and a second outlet intended to lead toward an outside of said module; and
    a duct that connects the first outlet of the double dispenser to the intake box, the duct being connected to the first outlet of the double dispenser by an interlocked connection and the duct being connected to the intake box by another interlocked connection,
    wherein the connection between the duct and the intake box is a sliding connection, and the connection between said duct and the first outlet of the double dispenser is a ball joint connection.

* * * * *